(12) United States Patent
Qian et al.

(10) Patent No.: US 7,058,351 B2
(45) Date of Patent: Jun. 6, 2006

(54) SCANNING DEVICE HAVING A ROTATABLE AND LENGTH-ADJUSTABLE HINGE FOR COUPLING A COVER WITH A SCANNING BODY

(75) Inventors: Ming-Kuan Qian, TaiZhou (CN); Kun-Yee Yang, Banciao (TW)

(73) Assignee: BenQ Corporation, Taoyuan Shien (TW)

( * ) Notice: Subject to any disclaimer, the term of this patent is extended or adjusted under 35 U.S.C. 154(b) by 55 days.

(21) Appl. No.: 10/921,800

(22) Filed: Aug. 20, 2004

(65) Prior Publication Data

US 2005/0042006 A1 Feb. 24, 2005

(30) Foreign Application Priority Data

Aug. 21, 2003 (TW) ............................... 92123075 A

(51) Int. Cl.
*G03G 15/00* (2006.01)
*H04N 1/04* (2006.01)

(52) U.S. Cl. ...................... 399/380; 399/211; 399/262; 358/497

(58) Field of Classification Search ................ 399/380, 399/262, 211; 358/497
See application file for complete search history.

(56) References Cited

U.S. PATENT DOCUMENTS

| | | | | | |
|---|---|---|---|---|---|
| 4,150,896 | A | * | 4/1979 | Wakeman | ...................... 355/75 |
| 5,812,285 | A | * | 9/1998 | Lin et al. | ..................... 358/497 |
| 6,163,927 | A | * | 12/2000 | Leu | ............... 16/272 |
| 6,530,122 | B1 | * | 3/2003 | Kondou et al. | ............... 16/335 |
| 6,567,191 | B1 | * | 5/2003 | Huang | ......................... 358/487 |
| 2003/0198493 | A1 | * | 10/2003 | Gomi et al. | ................. 399/380 |
| 2005/0031390 | A1 | * | 2/2005 | Orozco-Abundis | ......... 399/380 |

\* cited by examiner

*Primary Examiner*—Andrew H. Hirshfeld
*Assistant Examiner*—Marvin Crenshaw
(74) *Attorney, Agent, or Firm*—Rabin & Berdo, PC

(57) ABSTRACT

A scanning device comprises a scanning body, a hinge and a cover. The scanning body has a first slot horizontally extended and formed at one side of the scanning body. The hinge has an upper portion and a lower portion engaged to each other and relatively movable for changing a length of the hinge. The lower portion of the hinge is disposed in the first slot and rotatably coupled to the scanning body. The cover is rotatably coupled to the upper portion of the hinge. When the cover is in a closed position, the hinge is received in the first slot. When an original medium to be scanned with a thickness is placed on the scanning body and positioned by the cover, the hinge is correspondingly rotated to a first position and extended to a first length.

14 Claims, 18 Drawing Sheets

SCANNING DEVICE HAVING A ROTATABLE AND LENGTH-ADJUSTABLE HINGE FOR COUPLING A COVER WITH A SCANNING BODY

This application claims the benefit of Taiwan application Serial No. 092123075, filed Aug. 21, 2003, the subject matter of which is incorporated herein by reference.

BACKGROUND OF THE INVENTION

1. Field of the Invention

The invention relates in general to a scanning device, and more particularly to a scanning device having a rotatable and length-adjustable hinge for coupling a cover and a scanning body.

2. Description of the Related Art

An original medium to be scanned by a scanning device could be a piece of paper and document, or a book. It is desirable to design a scanning cover to adjust the positioning of the original mediums to be scanned with different thickness. For holding varied to-be-scanned medium, particularly a thick original medium, a hinge coupled the cover and the scanning body should be adjustable and length-changeable.

In the prior art design, the conventional hinges are mostly adjustable on the axial direction of hinges; however, they may not perform well and the application of hinge in scanning devices still has limitation. For example, a conventional hinge mainly comprises an axial rod and an openable structure with two pads. An elongated slot is vertically formed in the scanning body for receiving the axial rod of the hinge. One pad of the openable structure is fixed to the cover, and the other pad of the openable structure is mounted on the axial rod. When the scanning device is not in use, the cover is in a closed position, most part of the axial rod is positioned in elongated slot, and the pads of the openable structure are attached to each other (i.e. openable structure being in a closed condition). When a thick original medium to be scanned is placed on the scanning platen of the scanning body, the cover is raised according to the thickness of the original medium; meanwhile, the axial rod is raised as well and exposed outside the elongated slot.

However, the depth of the elongated slot is limited by (i.e. smaller than) the thickness of the scanning body. Generally, the scanning device equipped with the contact image sensor (CIS) has a thinner scanning body. The length of the axial rod of the conventional hinge is limited by the thickness of the scanning body of the scanning device. Thus, the CIS scanning device using the conventional hinge may not be able to scan the to-be-scanned medium with the considerable thickness. The conventional hinge still has the limitation in application.

SUMMARY OF THE INVENTION

It is therefore an object of the invention to provide a scanning device with a rotatable and length-adjustable hinge coupling the cover and the scanning body. Even the scanning body is thin, the hinge of the invention is still good to be applied and the scanning device in application is able to scan varied original mediums with different thickness. According to the invention, the cover is almost horizontally positioned over the original medium to be scanned during scanning, thereby acquiring the clear image.

The invention achieves the objects by providing a scanning device comprising a scanning body, a hinge and a cover. The scanning body has a first slot horizontally extended and formed at one side of the scanning body. The hinge has an upper portion and a lower portion engaged to each other and relatively movable for changing a length of the hinge. The lower portion of the hinge is disposed in the first slot and rotatably coupled to the scanning body. The cover is rotatably coupled to the upper portion of the hinge. When the cover is in a closed position, the hinge is received in the first slot. When an original medium to be scanned with a thickness is placed on the scanning body and positioned by the cover, the hinge is correspondingly rotated to a first position and extended to a first length.

The invention achieves the objects by providing another scanning device comprising a scanning body, a hinge and a cover. The scanning body has a first slot formed at one side of the scanning body, and the first slot is extended along a first direction. The hinge has a upper portion and a lower portion engaged to each other and relatively movable along a second direction for changing a length of the hinge on the second direction. The lower portion is rotatably disposed in the first slot. The cover is rotatably coupled to the upper portion of the hinge.

When the cover is in a closed position, the upper portion and the lower portion are received in the first slot, and the first direction is substantially identical to the second position. When an original medium to be scanned is placed on the scanning body and positioned by the cover, the hinge is rotated to a first position according to a thickness of the original medium, and the first direction and the second direction lies an angle; meanwhile, the upper portion and the lower portion are relatively moved away from each other for selectively changing a length of the hinge along the second direction.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
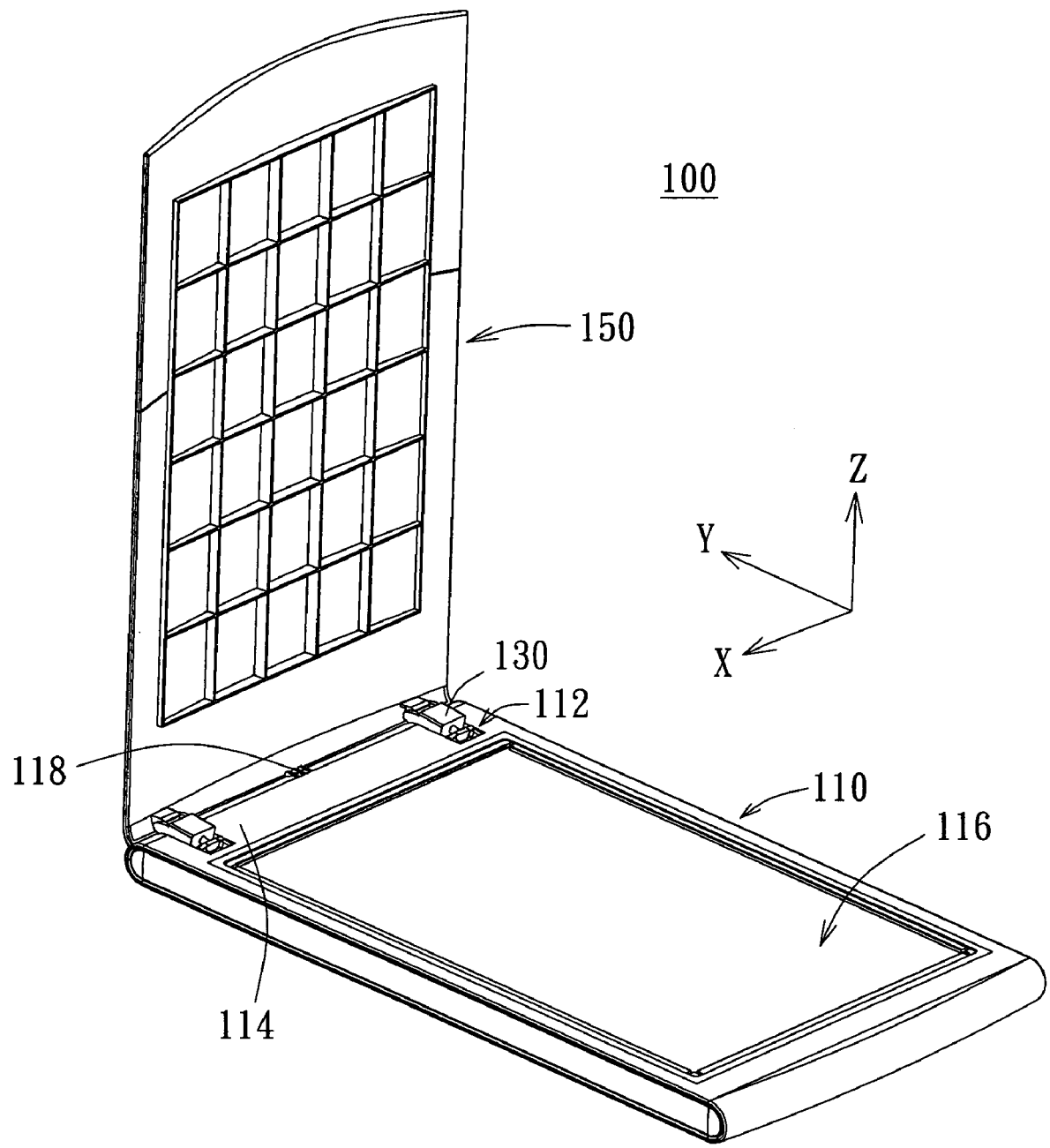
FIG. 1 schematically illustrates a scanning device according to the first embodiment of the invention.

In the present invention, a hinge with rotatable and length-adjustable design, or a hinge at least with one end able to slide within a groove, is horizontally disposed in a scanning device for coupling a cover and a scanning body. According to the invention, the cover is almost horizontally positioned over a thick original medium to be scanned during scanning, thereby acquiring the clear image.

In the present invention, a holding apparatus for positioning the subscriber identification module (SIM) card is mechanically constructed. The SIM card can be accepted and positioned in a containing space by rotating a U-shaped frame to a closed position, also, can be removed by rotating the U-shaped frame to an opened position. Therefore, the conventional problems usually occurs during the SIM card replacement, such as carelessly losing the SIM card, scratching the surface or damaging the inner electrical components of the SIM card, are solved according to the invention. In the preferred embodiment of the invention, a portable phone is the applied electronic product for illustrating the holding apparatus for positioning the SIM card in detail.

The embodiments disclosed herein are for illustrating the invention, but not for limiting the scope of the invention. Additionally, the drawings used for illustrating the embodiments Of the invention only show the major characteristic parts in order to avoid obscuring the invention. Accordingly, the specification and the drawing are to be regard as an illustrative sense rather than a restrictive sense. Also, the dimensions, materials, shapes, relative disposition of constituent,components described in these embodiments should be modified or changed depending on the construction and various conditions of a scanning device.

First Embodiment

FIG. 1 schematically illustrates a scanning device according to the first embodiment of the invention. The scanning device 100 comprises a scanning body 100, a hinge 130 and a cover 150. The hinge 130 is used for rotatably coupling the cover 150 and the scanning body 110, so that the pivoting of the cover 150 on the scanning body 110 is allowed. The scanning body 110 comprises a top surface cover 114, a transparent scanning platen 116 and a scan module (not shown in FIG. 1). The slots 112, extended along Y direction of FIG. 1, are disposed at two sides of the top surface cover 114 for receiving the hinges 130. The transparent scanning platen 116 is assembled with the top surface cover 114 and used for placing the original medium containing the image to be scanned (not shown in FIG. 1). The scan module, containing optical components (such as electronic sensors, lamp . . . ), is disposed below the top surface cover 114 and driven to move across the length of the original medium to be scanned during scanning. The original medium to be scanned placed on the transparent scanning platen 116 is held in position by the cover 150, and thus the image of the original medium is accurately captured by the scan module.

Figure 2A:
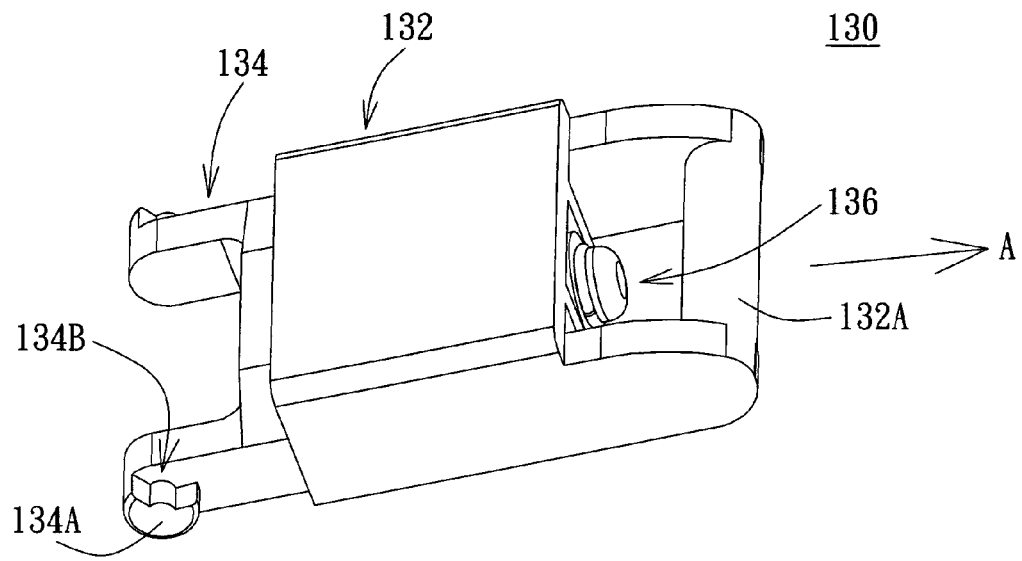
FIG. 2A illustrates the hinge of FIG. 1 in a front view angle.
Figure 2B:
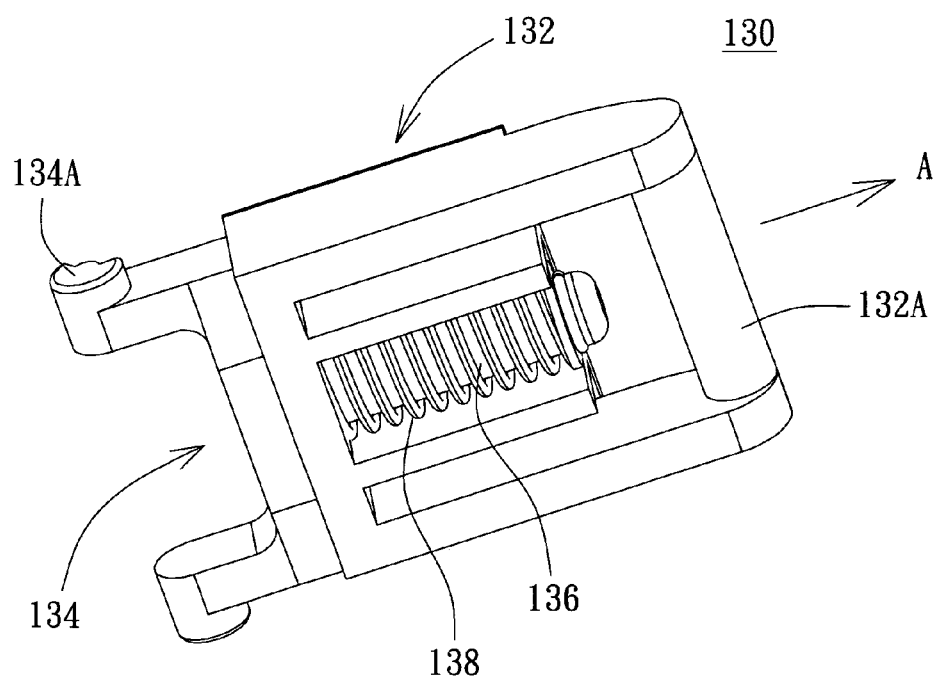
FIG. 2B illustrates the hinge of FIG. 1 in a bottom view angle.

FIG. 2A illustrates the hinge of FIG. 1 in a front view angle. FIG. 2B illustrates the hinge of FIG. 1 in a. bottom view angle. The hinge 130 comprises an upper portion 132, a lower portion 134, a guiding shaft 136 and an elastic component 138. The elastic component 138 is mounted on the guiding shaft 136. The upper portion 132 and the lower portion 134 are coupled to each other, and can be relatively moved along the extending direction of the guiding shaft 136. Without an external force acting on the hinge 130, the upper portion 132 and the lower portion 134 are firmly engaged. Also, there is a first rotating shaft 132A disposed at the upper portion 132 and coupled with the cover 150. A projecting portion 134A is further disposed at the lower portion 134 for coupling with the top surface cover 114 of the scanning body 110.

Figure 3:
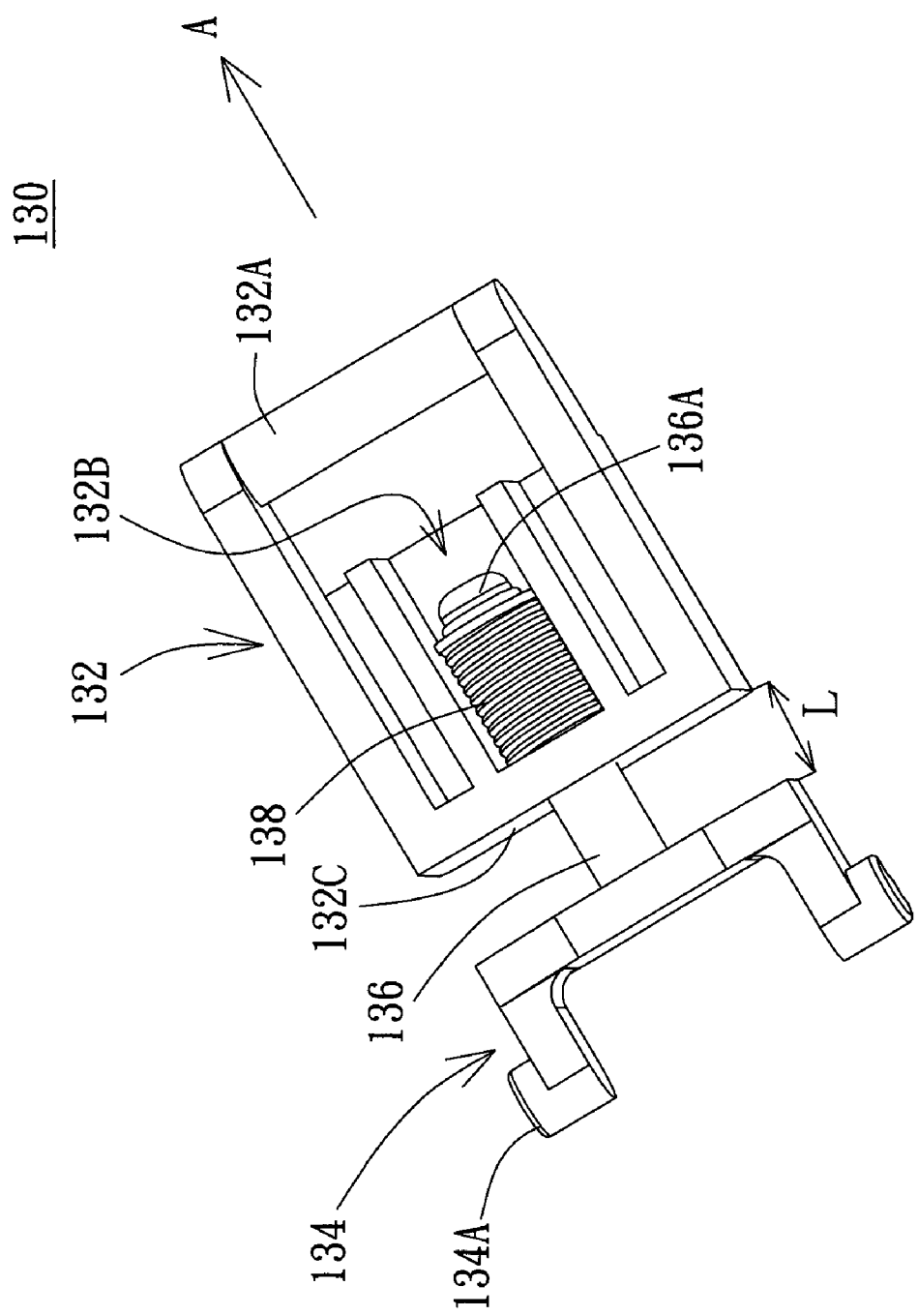
FIG. 3 illustrates the compression of the elastic component of the hinge according to the first embodiment of the invention.

FIG. 3 illustrates the compression of the elastic component of the hinge according to the first embodiment of the invention. It is assumed that the extending direction of the guiding shaft 136 is direction A, as indicated in FIG. 3. The relative movement between the upper portion 132 and the lower portion 134 is generated along the direction A, so as to change the length of the hinge 130 along the direction A. When an external force is applied to start the relative movement (along the direction A) between the upper portion 132 and the lower portion 134, the elastic component 138 is simultaneously deformed. As shown in FIG. 3, if the forces act on the upper portion 132 and the lower portion 134 in opposite directions, both of them are going to be apart from each other in a distance of L along the direction A. Meanwhile, the elastic component 138 is compressed, and the overall length of the hinge 130 increases of length L. If the forces cease to act on the upper portion 132 and the lower portion 134, the elastic recovery force of the compressed elastic component 138 will bring the upper portion 132 and the lower portion 134 back to the original position, as depicted in FIG. 2A and FIG. 2B.

Moreover, a guiding slot 132B is configured on the upper portion 132 for receiving the guiding shaft 136. One end of the guiding shaft 136 is attached to the lower portion 134, and the rest of the guiding shaft 136 is inserted through the guiding opening 132C and received in the guiding slot 132B. Also, a securing component 136A is further disposed on the other end of the guiding shaft 136 (resting in the guiding slot 132B) for blocking one end of the elastic component 138. The other end of the elastic component 138 is against the bottom side of the upper portion 132; therefore, the elastic component 138 is capable of being compressed or extended between the securing component 136A and the guiding opening 132C. Additionally, the lower portion 134 could be configured to have a U-shaped cross-section, and a pair of projecting portions 134A is disposed at two ends of the lower portion 134.

Figure 4:
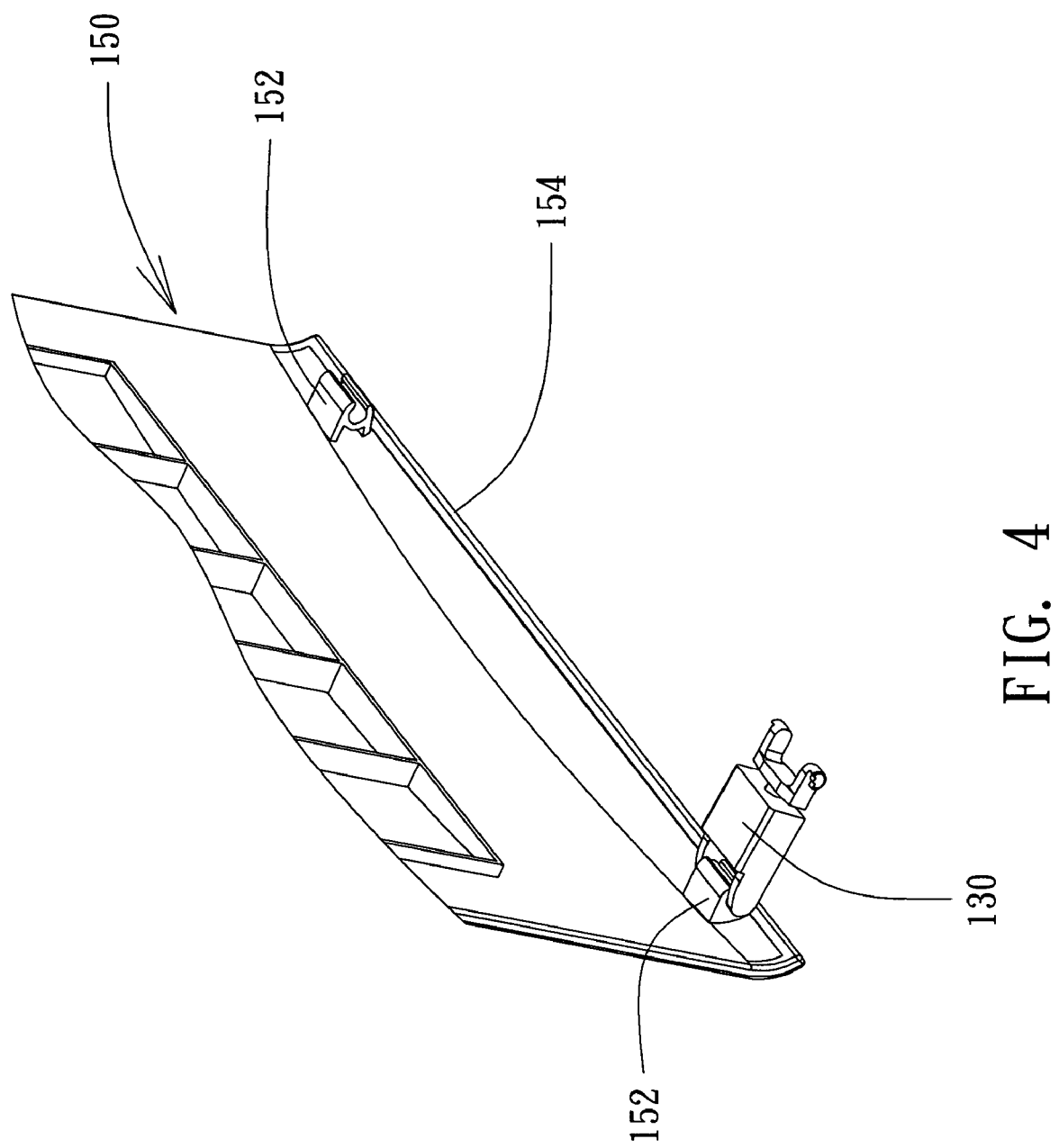
FIG. 4 illustrates the hinge coupled with the cover according to the first embodiment of the invention.

FIG. 4 illustrates the hinge coupled with the cover according to the first embodiment of the invention. The first holding portions 152 are formed near the bottom edge 154 of the cover 150 for rotatably engaging with the first rotating shafts 132A, thereby allowing the pivoting of the cover 150 on the first rotating shafts 132A.

Figure 5:
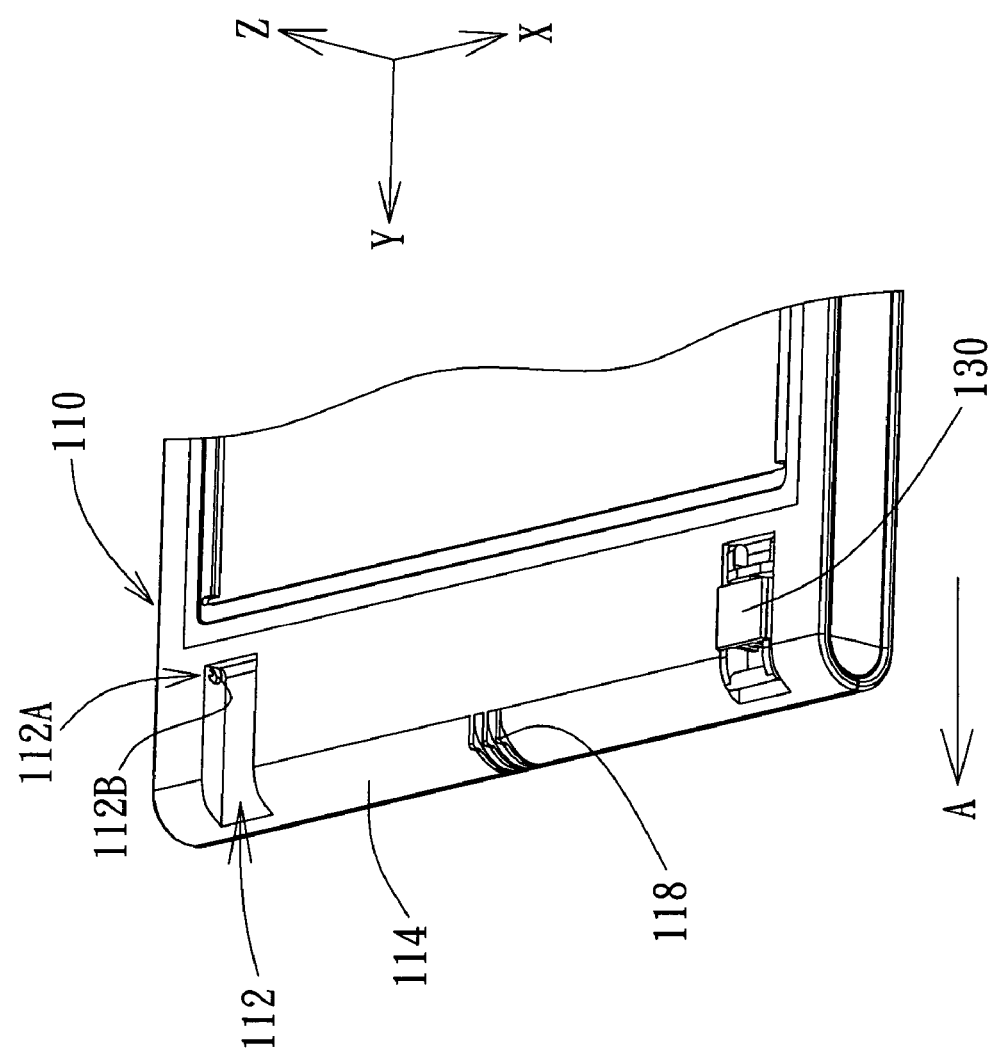
FIG. 5 illustrates the arrangement of the hinge and the scanning body according to the first embodiment of the invention.

FIG. 5 illustrates the arrangement of the hinge and the scanning body according to the first embodiment of the invention. The holes 112A are formed inside the slot 112 of the top surface cover 114. After the first projecting portions 134A are coupled with the holes 112A, the first projecting portions 134A serve as an axial rod on which the hinge 130 is rotated.

Moreover, a dot 112B is formed in the hole 112A, and a gap 134B is formed at the first projecting portion 134A (as shown in FIG. 2A). After the first projecting portion 134A is inserted into the hole 112A, the dot 112B is correspondingly received in the gap 134B. The rotating angle of the hinge 130 depends upon the position of the dot 112A and the size of the gap 134B.

To avoid the interference between the cover 150 and the top surface cover 114 of the scanning body 110, several ribs 118 are further formed at the edge of the scanning body 110. When the cover 150 is opened, it is against the ribs 118 during the rotating operation.

Figure 6:
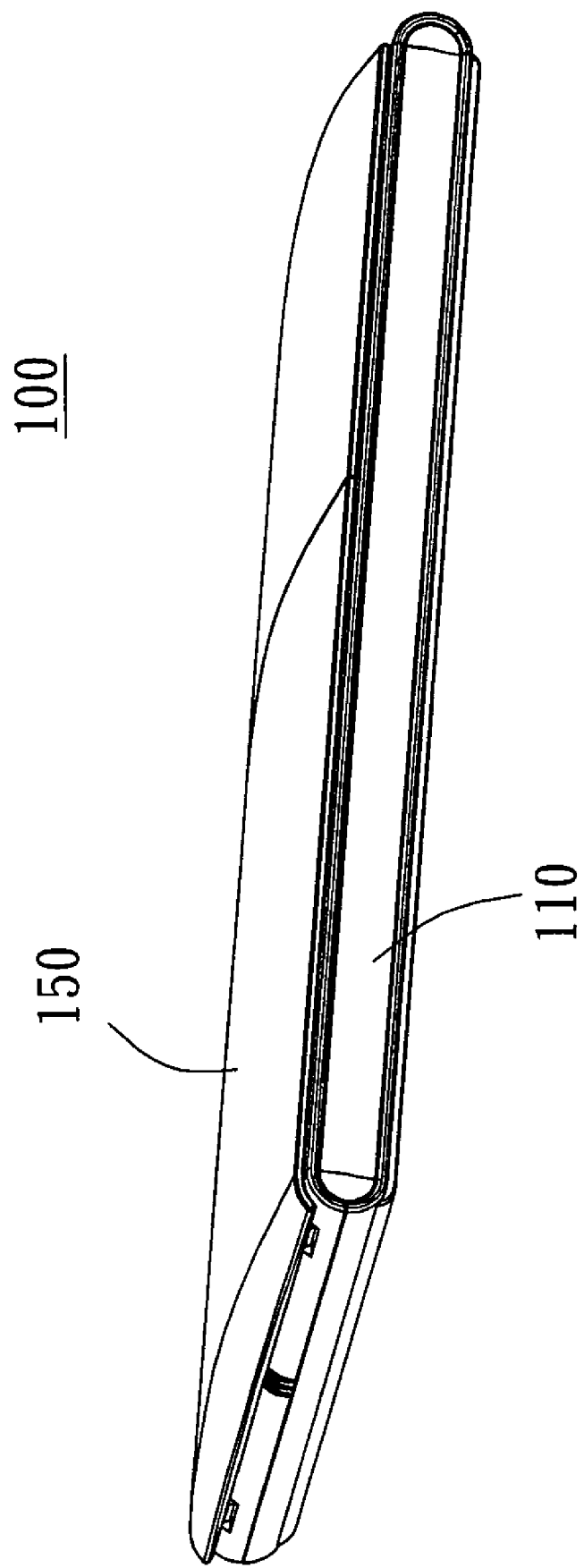
FIG. 6 illustrates the cover of the scanning device of the invention in closed position.

FIG. 6 illustrates the cover of the scanning device of the invention in closed position. Please also refer FIG. 5. When the cover 150 is in closed position, the upper portion 132 and the lower portion 134 of the hinge 130 are situated in the slot 112, and the cover 150 is fully placed over the scanning body 110. The extending direction of the guiding shaft 136 (i.e. direction A) is identical to the disposing direction of the slot 112, which means that direction A is substantially parallel to direction Y.

Figure 7:
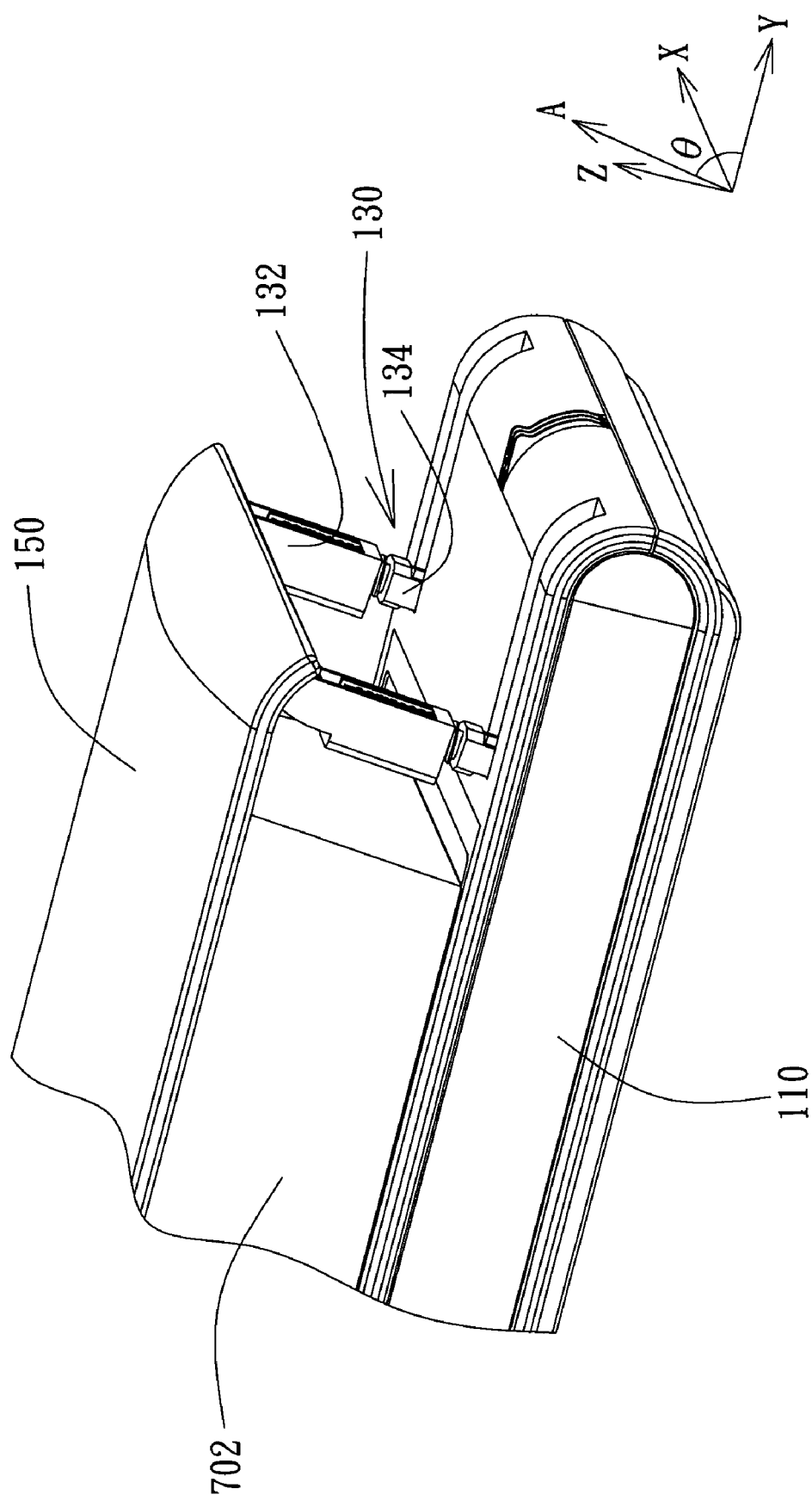
FIG. 7 illustrates a thick original medium to be scanned placed on the scanning body during scanning according to the first embodiment of the invention.

FIG. 7 illustrates a thick original medium to be scanned placed on the scanning body during scanning according to the first embodiment of the invention. When the thick original medium to be scanned 702 is placed on the scanning body 110 and positioned by the cover 150, the hinge 130 is rotated to a particular position according to the thickness of the original medium 702; meanwhile, the extending direction of the guiding shaft 136 (i.e. direction A) and the disposing direction of the slot 112 (i.e. direction Y) lies an angle of θ. The upper portion 132 and the lower portion 134 are selectively and relatively apart from each other, depending on the thickness of the original medium 702 to be scanned, to change the overall length of the hinge 130 along direction A.

Accordingly, when a thick original medium 702 needs to be scanned, rotation of the hinge 130 is performed, and an angle lies between the hinge 130 and the top surface cover 114. If the original medium 702 to be scanned is thicker, the angle between the hinge 130 and the top surface cover 114 is increased and the upper portion 132 and the lower portion 134 are separated farther; thus, the hinge 130 is extended longer. Due to the rotatable and extendable characteristics of the hinge 130, elastic recovery force of the elastic component 138 and the weight of the cover 150, the angle between the guiding shaft 136 of the hinge 130 (along the extending direction) and the cover 150 placed on the thick original medium 702 is still less than 90 degree. Therefore, the cover 150 is well placed on the top of the original medium 702, so as to press the original medium 702 against the transparent scanning platen 116 for acquiring a clear image.

Please also refer FIG. 1. When the closed cover 150 (as shown in FIG. 6) is opened to a fully opened position (as shown in FIG. 1), the ribs 118 serves as a fulcrum on which the cover 150 is pivoted. However, the first rotating shafts 132A and the equivalent rotation axis (the ribs 118 as a fulcrum) about the cover 150 rotates are not in the same straight line, the rotating angle and the extending length of the hinge 130 are limited in a specific range. The maximum extending length of the hinge 130 also has an effect on the maximum opening angle of the cover 150.

The elastic component 138 of the hinge 130 could be a spring (for example, a helical spring used in the first embodiment). When the original medium to be scanned is removed from the surface of the scanning body 110, the weight of the hinge 130 will put it back to the slot 112. Simultaneously, the elastic recovery force of the elastic component 138 brings the upper portion 132 and the lower portion 134 closer, and the hinge 130 is then returned to the original length. However, it is understood that the elastic component 138 is not a necessary element of the hinge 130 of the invention. Without the elastic component 138, the upper portion 132 and the lower portion 134 can be pushed back to the engaged condition and the hinge 130 is placed into the slot 112 all by a manual operation (i.e. by user's hand) after the original medium to be scanned is removed.

Second Embodiment

Figure 8A:
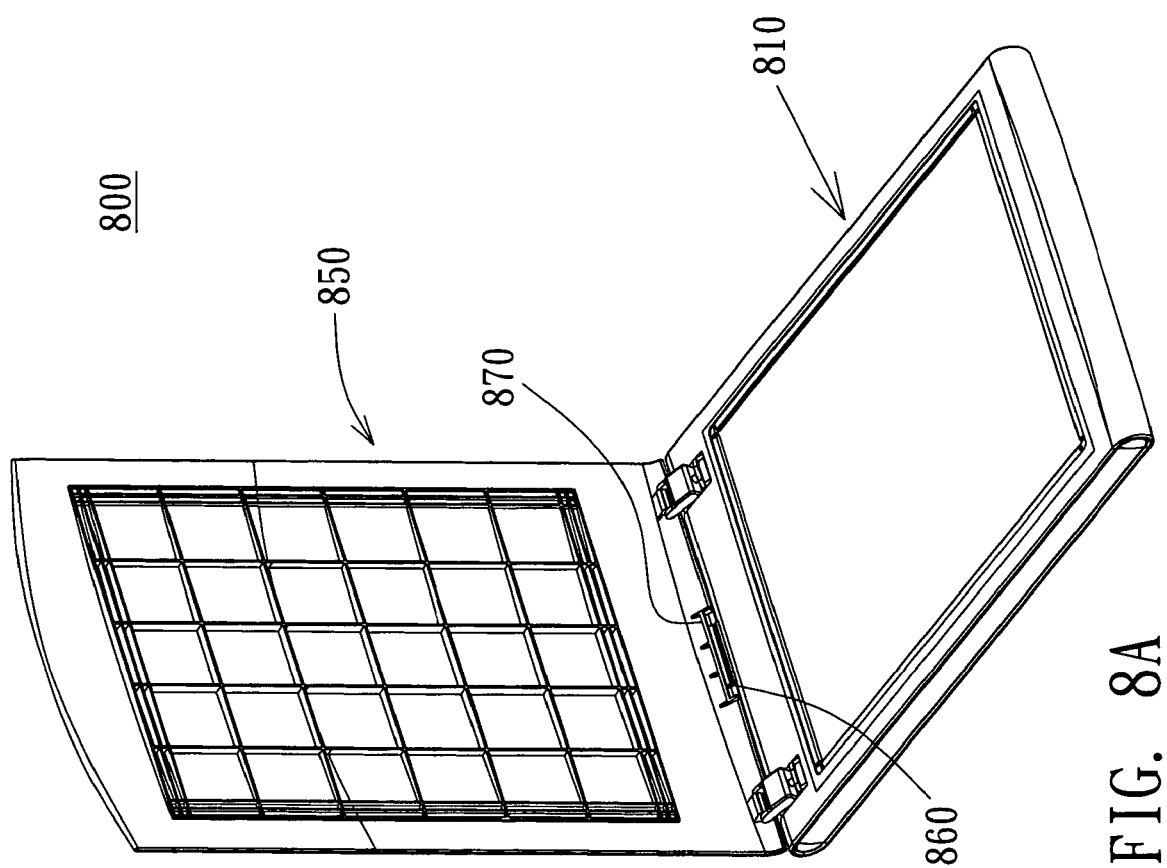
FIG. 8A schematically illustrates a scanning device according to the second embodiment of the invention.
Figure 8B:
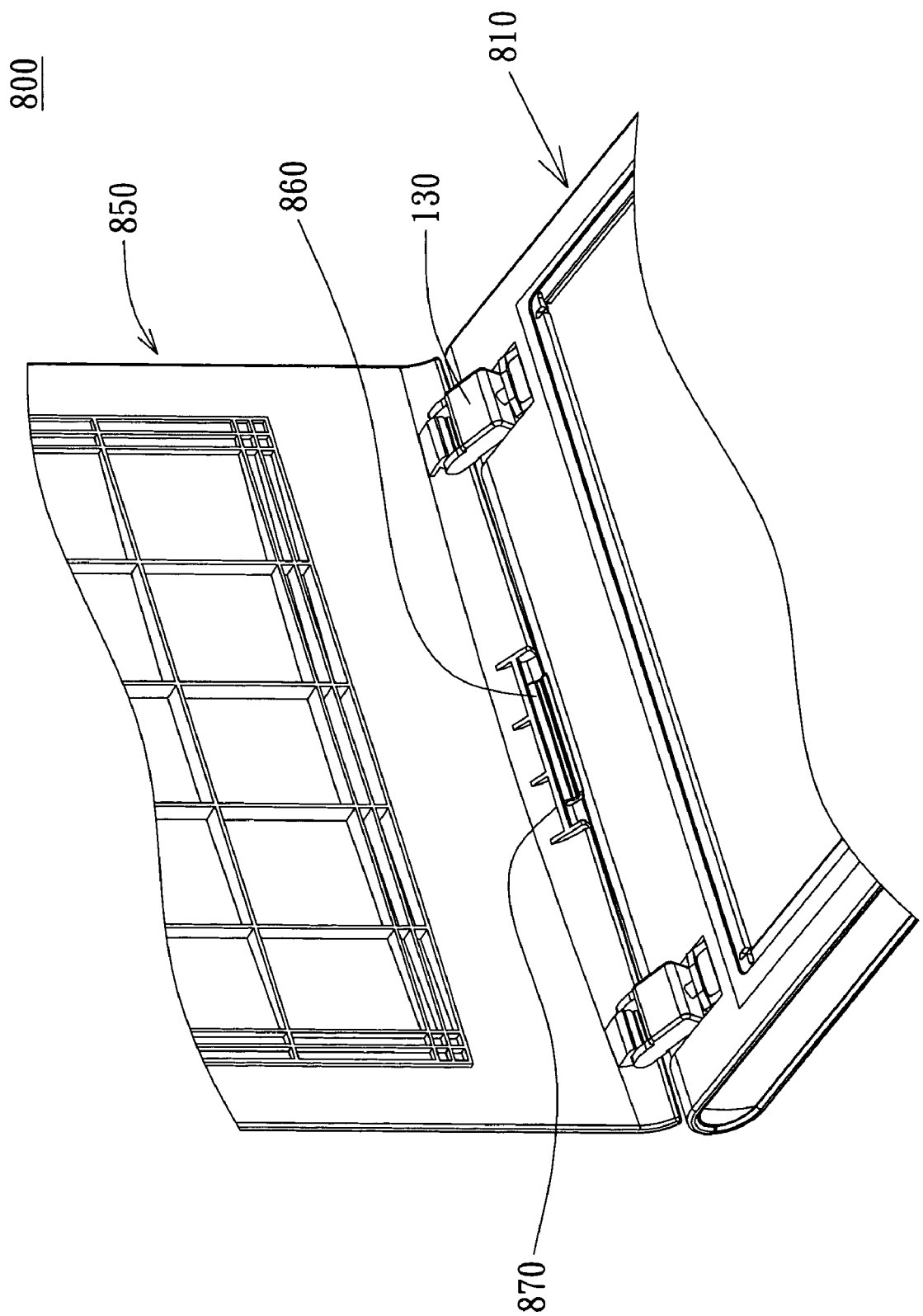
FIG. 8B is an enlarged view of the partial scanning device of FIG. 8A.

In the second embodiment, the ribs described in the first embodiment are replaced by a centerpiece 860. FIG. 8A schematically illustrates a scanning device according to the second embodiment of the invention. FIG. 8B is an enlarged view of the partial scanning device of FIG. 8A. The centerpiece 860 is disposed at the edge of the scanning body 810. A bearing portion 870 is further formed at the cover 850. When the cover 850 is in the opening operation, the bearing portion 870 is against the centerpiece 860, and the centerpiece 860 serves as a rotating axis on which the cover 850 is pivoted.

Figure 9:
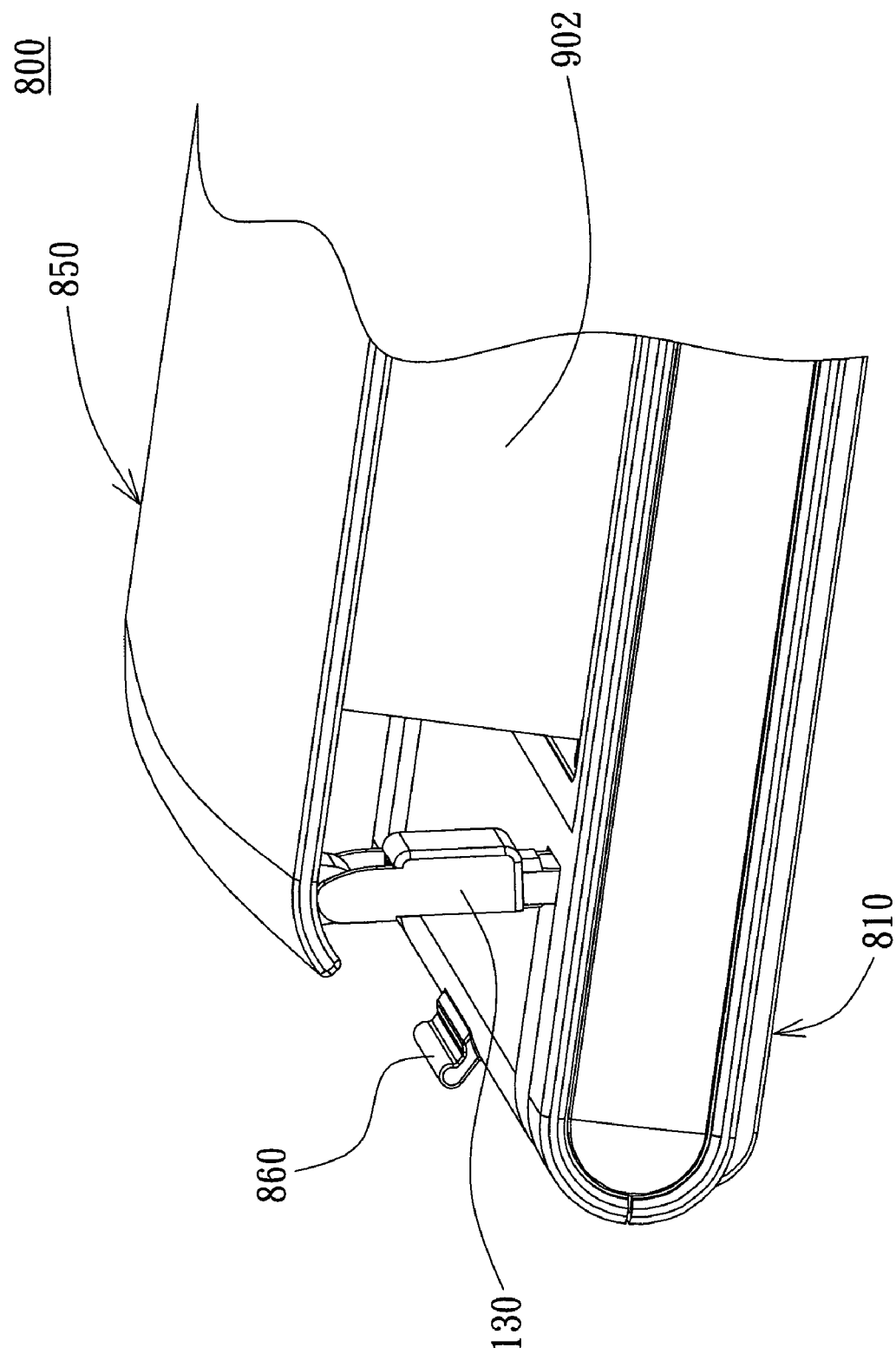
FIG. 9 illustrates a thick original medium to be scanned placed on the scanning body during scanning according to the second embodiment of the invention.

FIG. 9 illustrates a thick original medium to be scanned placed on the scanning body during scanning according to the second embodiment of the invention. When the thick original medium to be scanned 902 is placed on the scanning body 810 and positioned by the cover 850, the hinge 130 is rotated to a particular position according to the thickness of the original medium 902; meanwhile, the bearing portion 870 of the cover 850 is completely separated from the centerpiece 860.

Third Embodiment

Figure 10:
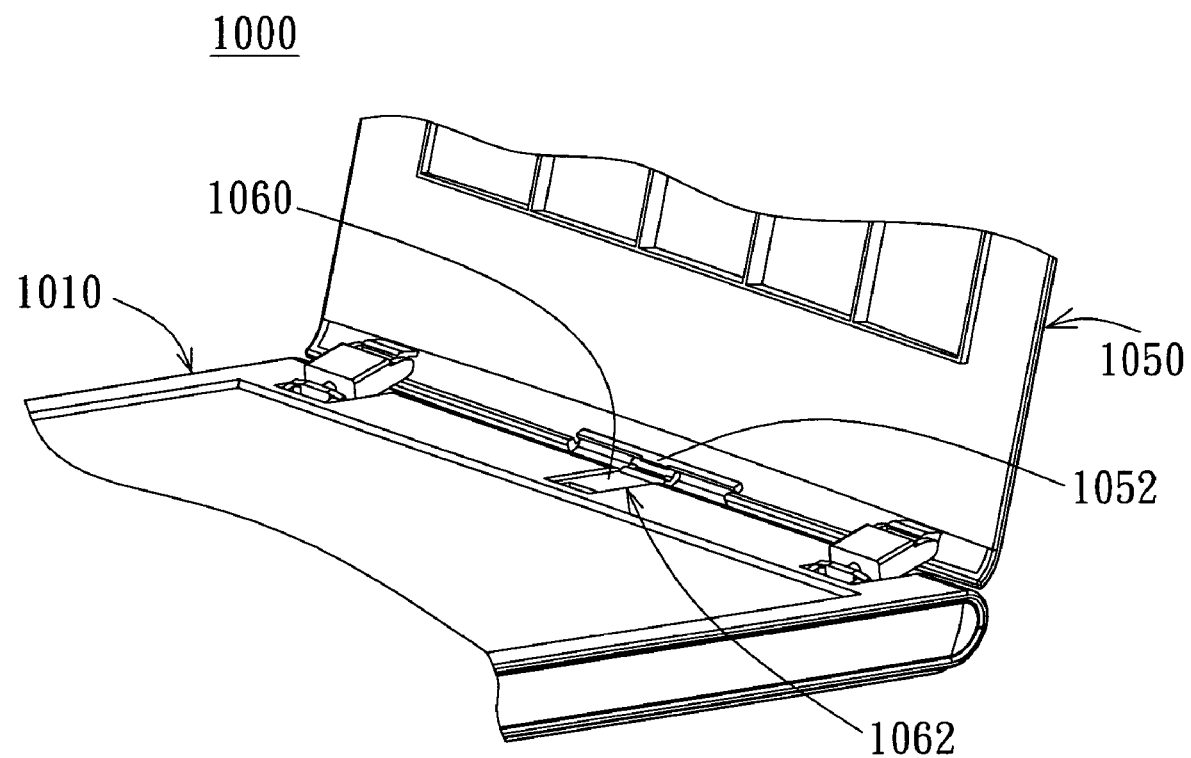
FIG. 10 schematically illustrates an enlarged view of the partial scanning device according to the third embodiment of the invention.
Figure 11A:
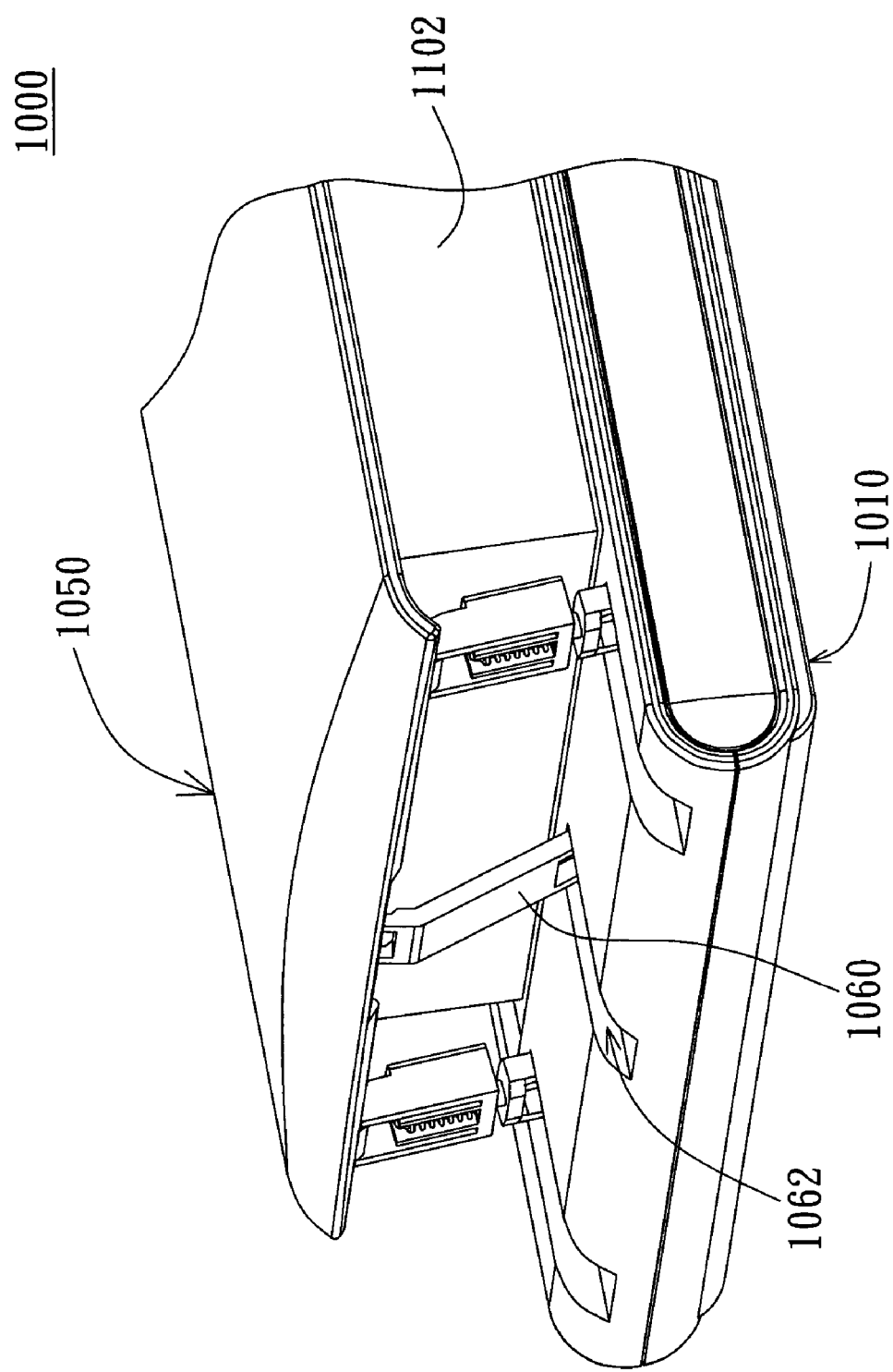
FIG. 11A illustrates a thick original medium to be scanned placed on the scanning body during scanning according to the third embodiment of the invention.
Figure 11B:
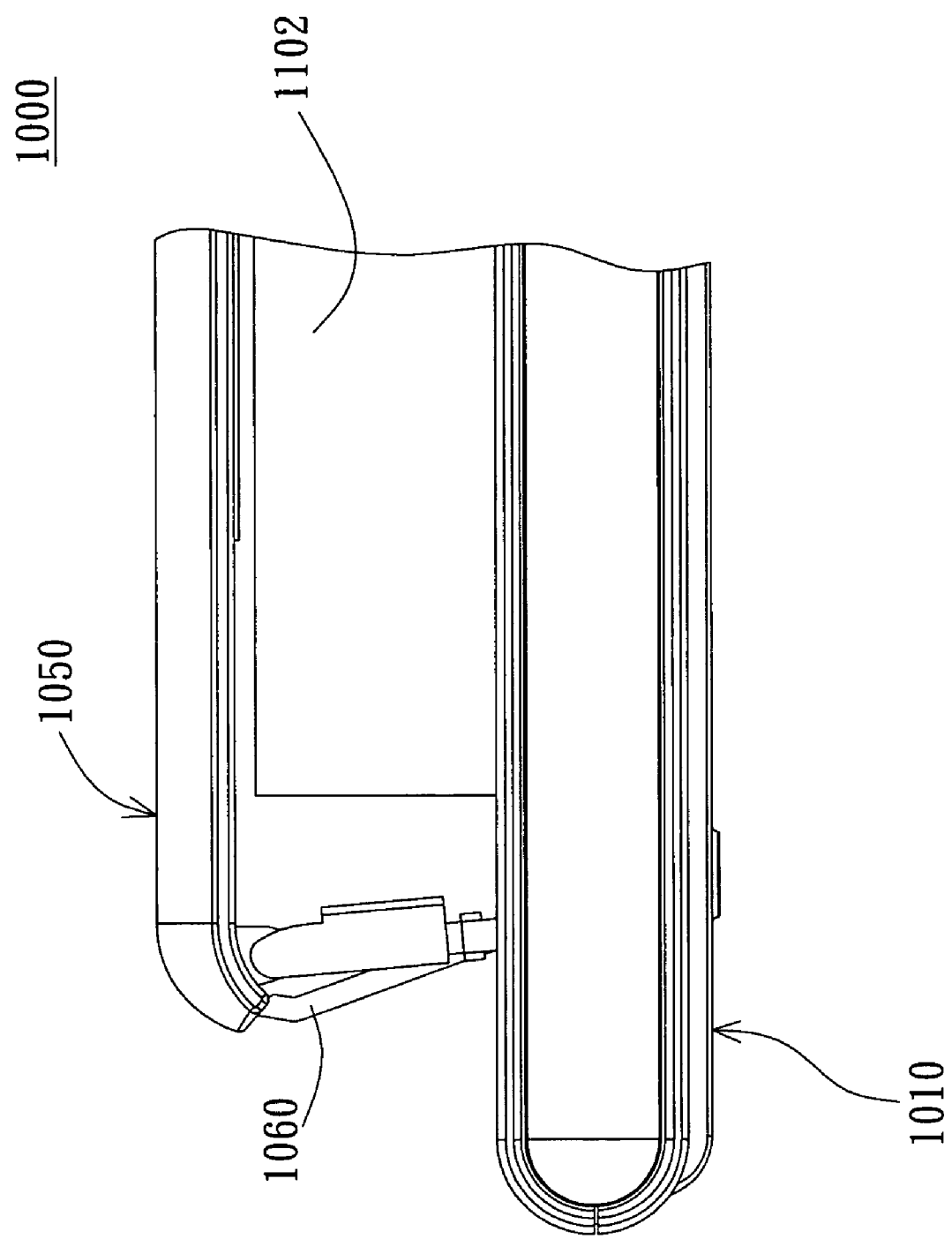
FIG. 11B is a side view of the scanning device of FIG. 11A.
Figure 12:
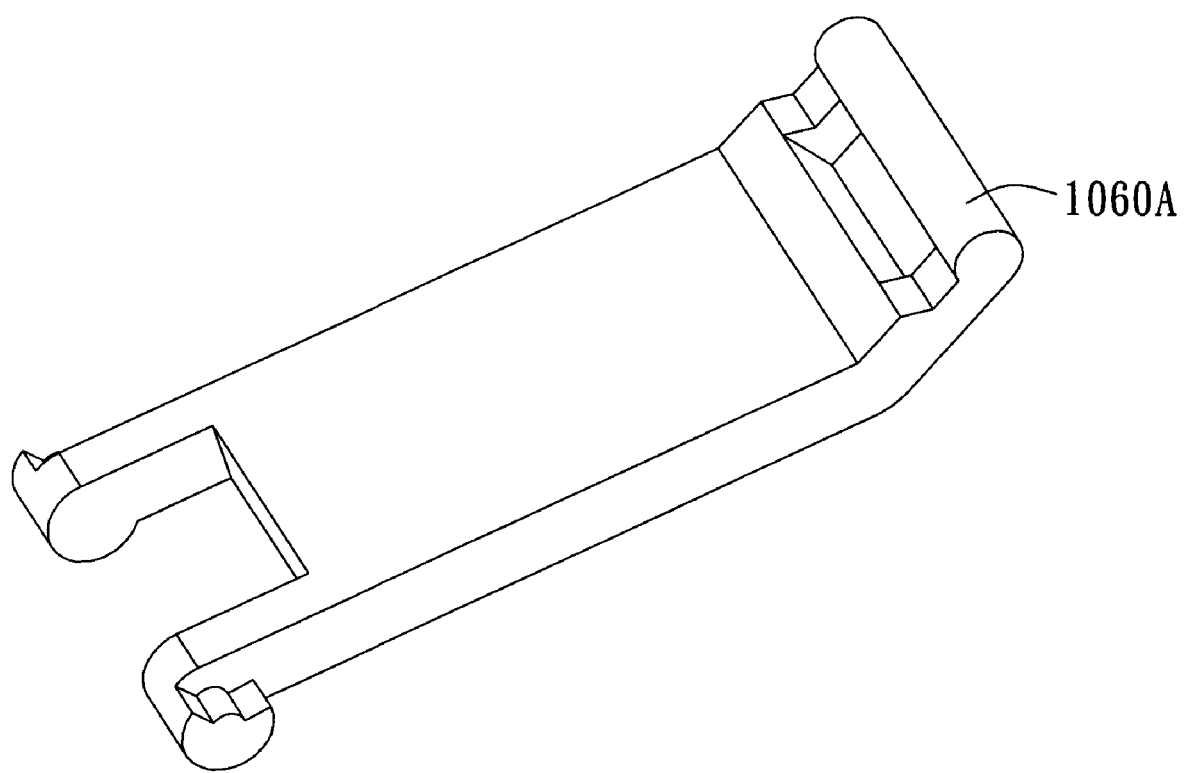
FIG. 12 schematically illustrates the rotatable centerpiece of FIG. 10.

In the third embodiment, the ribs described in the first embodiment are replaced by a rotatable centerpiece 1060. FIG. 10 schematically illustrates an enlarged view of the partial scanning device according to the third embodiment of the invention. FIG. 11A illustrates a thick original medium to be scanned placed on the scanning body during scanning according to the third embodiment of the invention. FIG. 11B is a side view of the scanning device of FIG. 11A. FIG. 12 schematically illustrates the rotatable centerpiece of FIG. 10.

A second slot 1062 is configured on the scanning body 1010, and a second holding portion 1052 is formed at the cover 1050. The rotatable centerpiece 1060 further has a second rotating shafts 1060A for coupling with the second holding portion 1052. The rotatable centerpiece 1060 is received in the second slot 1062, and rotatably coupled to the scanning body 1010.

When the cover 1050 is in a closed position, the rotatable centerpiece 1060 is substantially placed in the second slot 1062. When the cover 1050 is opened, the second rotating shaft 1060A is an axis on which the cover 1050 is pivoted. When the thick original medium to be scanned 1102 is placed on the scanning body 1010 and positioned by the cover 1050, the rotatable centerpiece 1060 is rotated to a second position according to the thickness of the original medium 1102; meanwhile, the second holding portion 1052 of the cover 1050 is still engaged with the second rotating shafts 1060A of the rotatable centerpiece 1066, as shown in FIG. 11A and FIG. 11B.

Fourth Embodiment

The hinge can also be designed as the structure at least with one end able to slide within a groove at the sidewall of the slot. In the fourth embodiment, a pair of flanges (projected from the sides of the first end of the hinge) and a pair of grooves (correspondingly formed at the sidewall of the slot) is taken for illustration.

Figure 13:
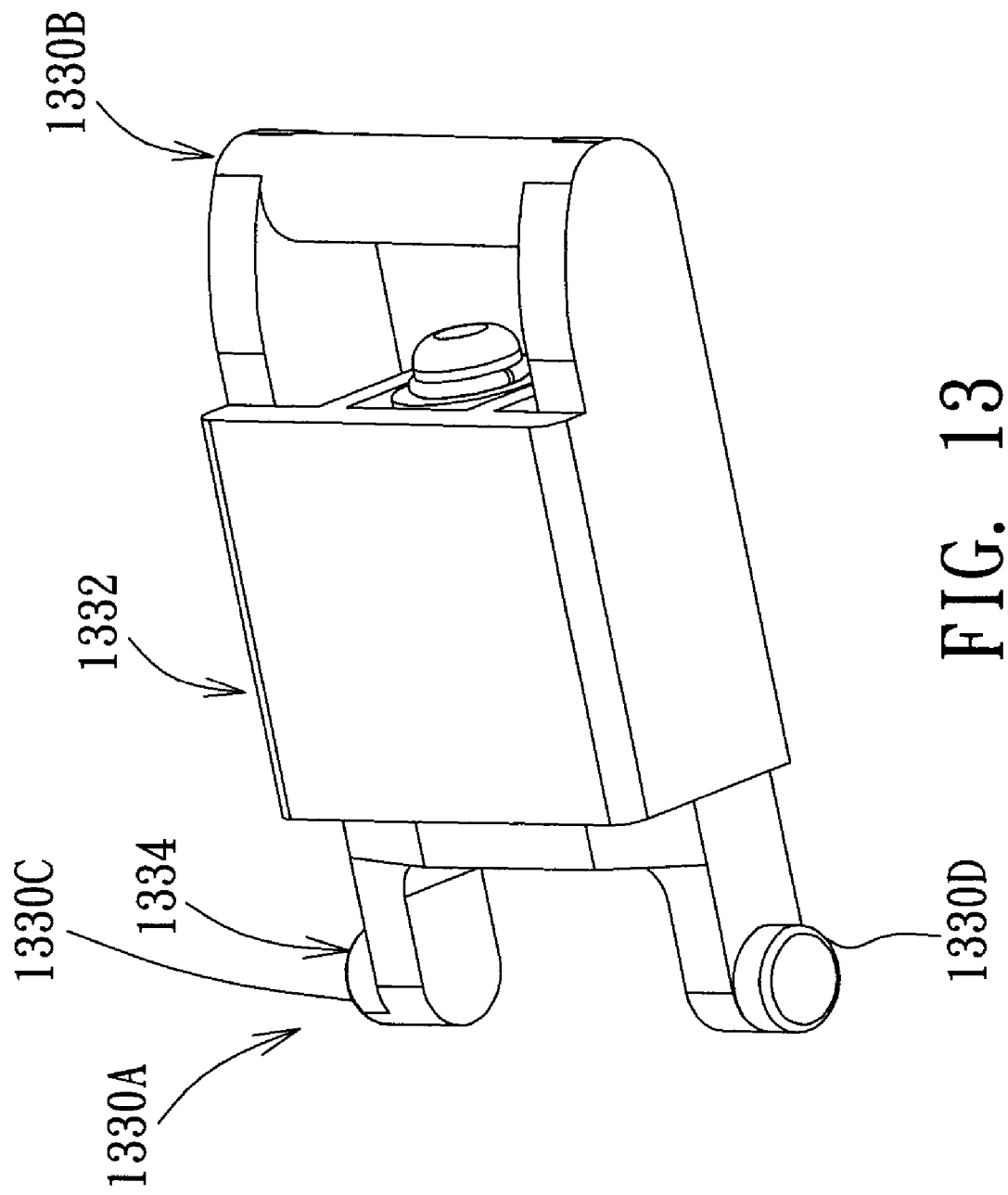
FIG. 13 schematically illustrates the hinge according to the fourth embodiment of the invention.
Figure 14:
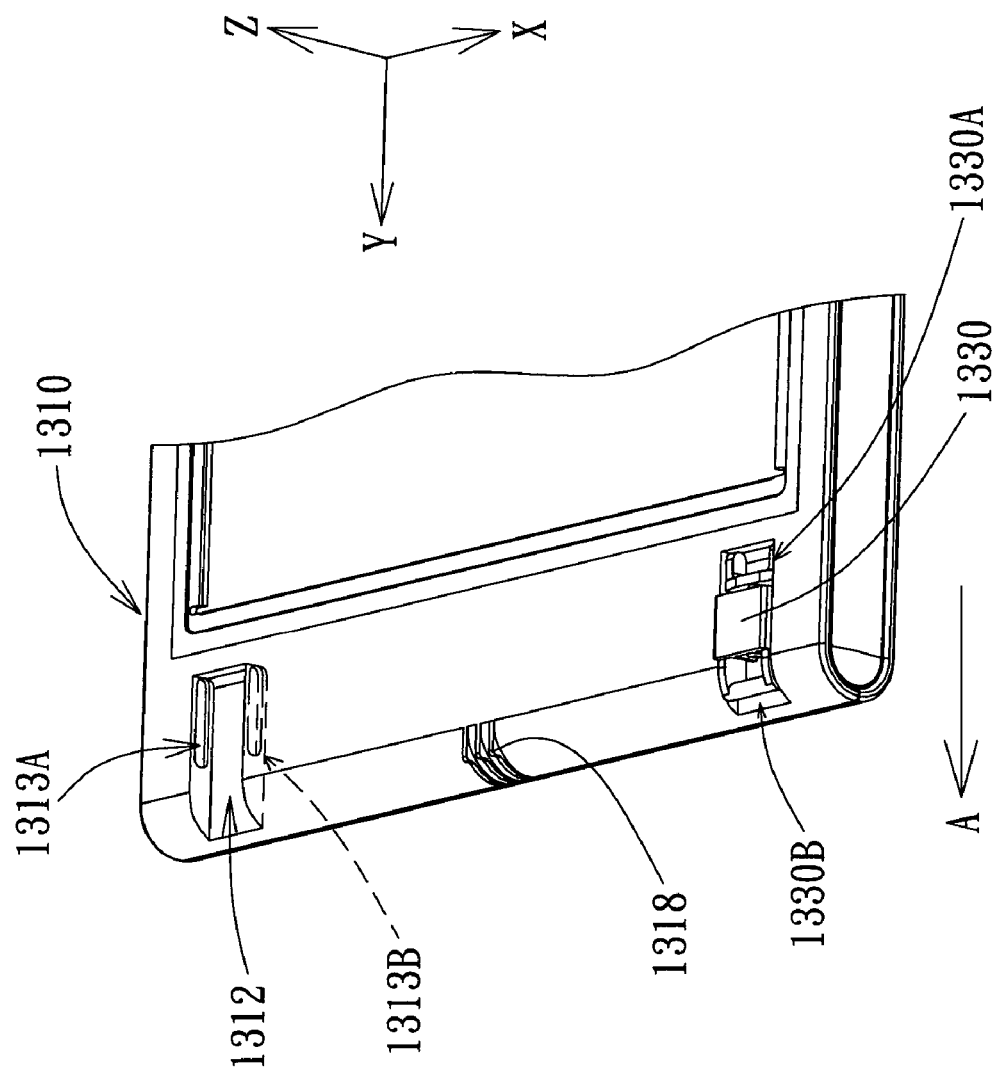
FIG. 14 illustrates the arrangement of the hinge and the scanning body according to the fourth embodiment of the invention.
Figure 15:
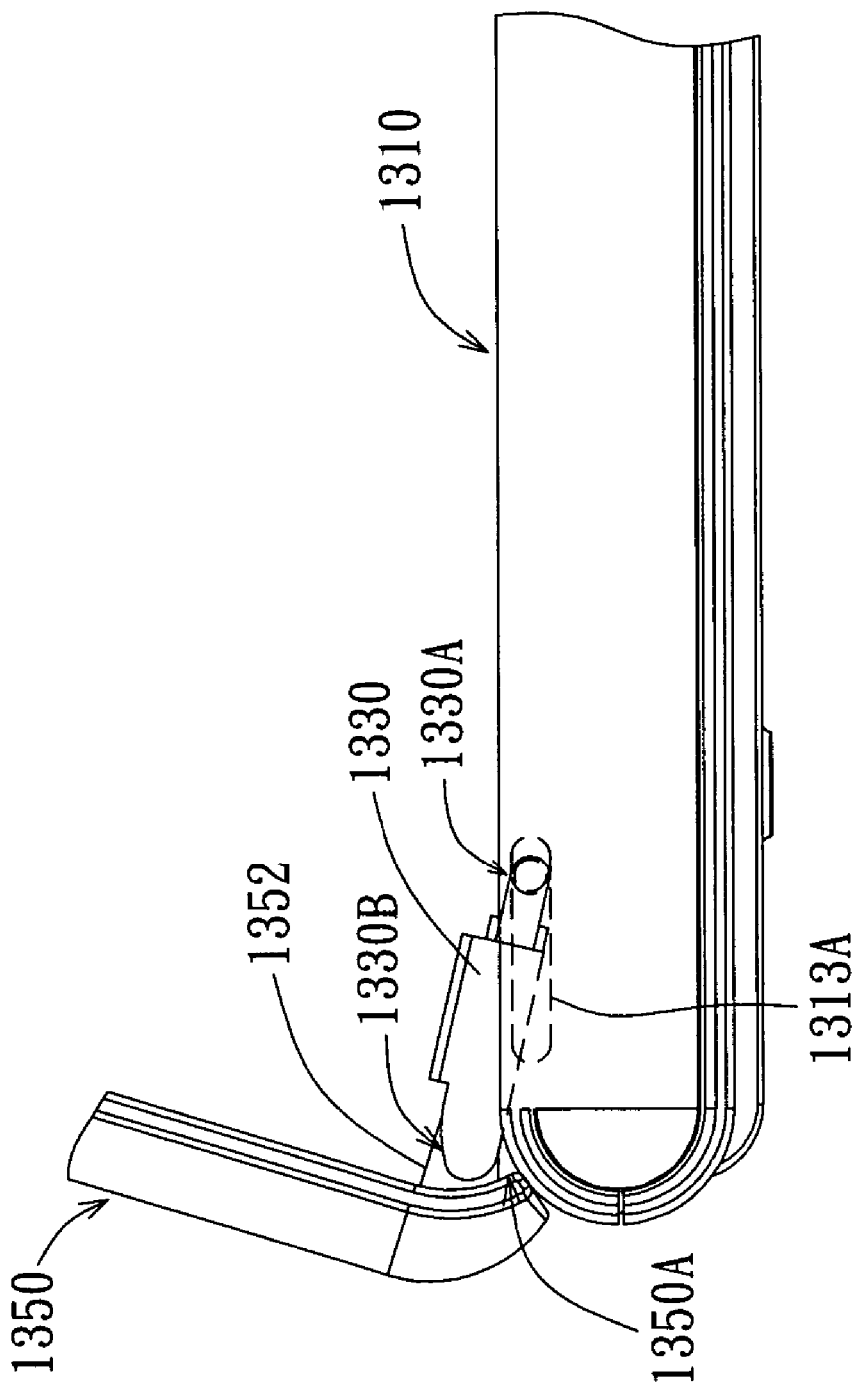
FIG. 15 is a side view of the partial scanning device according to the fourth embodiment of the invention.
Figure 16:
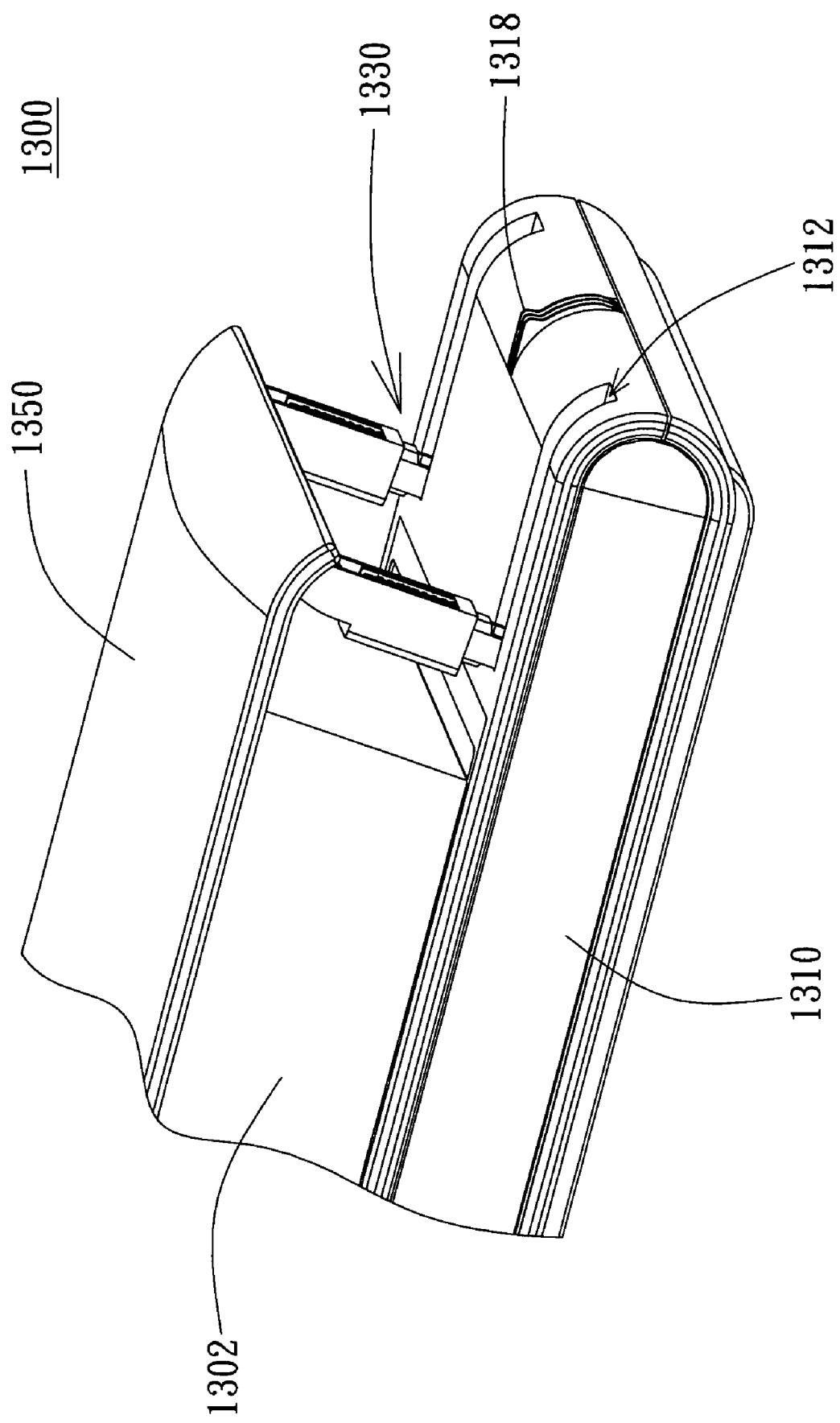
FIG. 16 illustrates a thick original medium to be scanned placed on the scanning body during scanning according to the fourth embodiment of the invention.

FIG. 13 schematically illustrates the hinge according to the fourth embodiment of the invention. FIG. 14 illustrates the arrangement of the hinge and the scanning body according to the fourth embodiment of the invention. FIG. 15 is a side view of the partial scanning device according to the fourth embodiment of the invention. FIG. 16 illustrates a thick original medium to be scanned placed on the scanning body during scanning according to the fourth embodiment of the invention.

In the fourth embodiment, the scanning device 1300 comprises a scanning body 1310, the hinges 1330, and the cover 1350. The scanning device 1310 has the slots 1312 and an orientable structure. The slots 1312 are configured at two ends of the first side of the scanning body 1310 for receiving the hinges 1330. The slot 1312 is horizontally extended towards the inner of the scanning body 1310. In the fourth embodiment, the ribs 1318 are used as the orientable structure: It is, of course, understood that the centerpiece 860 described in the second embodiment or the rotatable centerpiece 1060 described in the third embodiment could be used as the orientable structure as well. The orientable structure is disposed at the first side of the scanning body 1310.

In the slot 1312, the first end 1330A of the hinge 1330 is coupled to the scanning body 1310. The cover 1350 has a first holding portion 1352 disposed at the inner side of the lower edge 1350A of the cover 1350. The first holding portion 1352 is rotatably coupled to the second end 1330B of the hinge 1330.

When the cover 1350 is in the opened position, the hinges 1330 are placed in the slots 1312. When the cover 1350 is opening, the lower edge 1350A of the cover 1350 is against the orientable structure and performs the rotating movement. Also, the second end 1330B of the hinge 1330 protrudes from the slot 1312, as shown in FIG. 15.

Moreover, the grooves 1313A and 1313B are formed at two sides of the slots 1312. The flanges 1330C and 1330D (FIG. 13) are projected from the sides of the first end 1330A of the hinge 1330 and able to respectively slide within the grooves 1313A and 1313B, as shown in FIG. 15. When the cover 1350 is in the opening operation, the flanges 1330C and 1330D are respectively rotating and sliding within the grooves 1313A and 1313B, until the hinge 1330 is moved to a third position wherein the second end 1330B of the hinge 1330 is projected from the slot 1312. When a thick original medium to be scanned is placed on the scanning body 1310 and positioned by the cover 1350, the flanges 1330C and 1330D are respectively rotated inside the grooves 1313A and 1313B to raise the cover 1350, until the hinge 1330 is rotated to a fourth position corresponding to the thickness of the original medium.

Also, the hinge 1300 of the fourth embodiment could comprise a upper portion 1332 and a lower portion 1334, which are engaged and able to be relatively moved to each other as the description of the first embodiment. The lower portion 1334 is placed in the slot 1312 and rotatably coupled to the scanning body 1310. The upper portion 1332 is rotatably coupled to the cover 1350. When a thick original medium to be scanned is placed on the scanning body 1310 and positioned by the cover 1350, the hinge 1330 is rotated to a first position and extended to a first length.

If the centerpiece 860 of the second embodiment is used as the orientable structure herein, a bearing portion is further formed at the lower edge 1350A of the cover 1350. When the cover 1350 is in the opening operation, the bearing portion is against the centerpiece, and the centerpiece serves as a rotating axis on which the cover 1350 is pivoted.

If a rotatable centerpiece 1060 of the third embodiment is used as the orientable structure herein, a second slot and a second holding portion are further formed at the scanning body 1310 and the cover 1350, respectively. The second holding portion is formed at the lower edge 1350A of the cover 1350. The rotatable centerpiece further has a second rotating shaft for coupling with the second holding portion. The rotatable centerpiece in the second slot is rotatably coupled to the scanning body 1310.

When the cover 1350 is in a closed position, the rotatable centerpiece is substantially placed within the second slot. When the cover 1350 is opened, the second rotating shaft is an axis on which the cover 1350 is pivoted. When the thick original medium to be scanned is placed on the scanning body 1310 and positioned by the cover 1350, the rotatable centerpiece is rotated to a second position according to the thickness of the original medium.

According to the aforementioned description, the scanning device of the invention can be used to scan a thick original medium with a rotatable and a length-extendable hinge coupled to the cover, thereby allowing the cover to be adjusted (i.e. raised and lowered by means of rotatable and extendable hinge) to position the thick original medium to be scanned against the transparent scanning platen. Also, the hinge of the invention is horizontally disposed at the slot of the scanning body, the extending length of the hinge is thus not restricted by the thickness of the scanning body. Accordingly, the scanning device applied with the hinge of the invention is particularly suitable for scanning the original medium with a considerable thickness.

Also, the hinge of the invention is particularly suitable for a scanning device with a contact image sensor (CIS) optical system and a thin scanning body to acquire a clear image from a thick original medium.

While the invention has been described by way of examples and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A scanning device, comprising:
   a scanning body, having a first slot formed at one side of the scanning body, the first slot being extended along a first direction;
   a hinge, having an upper portion and a lower portion engaged to each other and being relatively movable along a second direction for changing a length of the hinge in the second direction, the lower portion being rotatably disposed in the first slot; and
   a cover, rotatably coupled to the upper portion of the hinge, wherein when the cover is in a closed position, the upper portion and the lower portion are received in the first slot, and the first direction is substantially identical to the second direction; and when an original medium to be scanned is placed on the scanning body and positioned by the cover, the hinge is rotated to a first position according to a thickness of the original medium, and the first direction and the second direction lies at an angle; meanwhile, the upper portion and the lower portion are relatively moved away from each other for selectively changing a length of the hinge along the second direction.

2. The scanning device according to claim 1, wherein the hinge further has a guiding shaft along which the upper portion and the lower portion are relatively moved.

3. The scanning device according to claim 2, wherein the hinge further has an elastic component mounted on the guiding shaft, when the upper portion and the lower portion are relatively moved along the guiding shaft, the elastic component is simultaneously deformed.

4. The scanning device according to claim 1, wherein the upper portion of the hinge further has a first rotating shaft, and the cover has a first holding portion for coupling with the first rotating shaft.

5. The scanning device according to claim 1, wherein the lower portion further has a first projecting portion, and the first slot has a hole for coupling with the first projecting portion, the first projecting portions serve as an axial rod on which the hinge is rotated.

6. The scanning device according to claim 1, wherein a rib is further disposed at the edge of the scanning body, and the cover is against the rib during the opening rotation.

7. The scanning device according to claim 1, wherein a centerpiece is formed at one side of the scanning body, and a bearing portion is formed at the cover, wherein when the cover is opening, the bearing portion is against the centerpiece, and the centerpiece serves as a rotating axis on which the cover is pivoted.

8. The scanning device according to claim 1, wherein the scanning device further has a rotatable centerpiece, the scanning body has a second slot and the cover has a second holding portion;

the rotatable centerpiece further has a second rotating shaft for coupling with the second holding portion, and the rotatable centerpiece is disposed in the second slot and rotatably coupled to the scanning body;

when the cover is in the closed position, the rotatable centerpiece is substantially placed within the second slot;

when the cover is opened, the second rotating shaft is an axis on which the cover is pivoted;

when the original medium to be scanned is placed on the scanning body and positioned by the cover, the rotatable centerpiece is rotated to a second position.

9. A scanning device, comprising:

a scanning body, having a first slot and an orientable structure, the first slot being formed at one side of the scanning body and being horizontally extended towards an inside of the scanning body;

a hinge, having a first end in the first slot coupled to the scanning body; and a cover, having a lower edge and a first holding portion, the first holding portion being disposed at the lower edge and being rotatably coupled to a second end of the hinge;

wherein when the cover is in a closed position, the hinge is received in the first slot; and when the cover is opening, the lower edge of the cover is against the orientable structure during rotation of the cover, and the second end of the hinge is projected from the first slot.

10. The scanning device according to claim 9, wherein the hinge has an upper portion and a lower portion engaged to each other and able to moved relatively for changing a length of the hinge, the lower portion is disposed in the first slot and rotatably coupled to the scanning body, the upper portion is rotatably coupled to the cover, wherein when a thick original medium to be scanned is placed on the scanning body and positioned by the cover, the hinge is correspondingly rotated to a first position and extended to a first length.

11. The scanning device according to claim 9, wherein the orientable structure is a rib.

12. The scanning device according to claim 9, wherein the orientable structure is a centerpiece, and a bearing portion is formed at the cover, wherein when the cover is opening, the bearing portion is against the centerpiece, and the centerpiece serves as a rotating axis on which the cover is pivoted.

13. The scanning device according to claim 9, wherein the orientable structure is a rotatable centerpiece, the scanning body has a second slot and the cover has a second holding portion disposed at the lower edge;

one end of the rotatable centerpiece further has a second rotating shaft for coupling with the second holding portion, and the rotatable centerpiece is disposed in the second slot and rotatably coupled to the scanning body;

when the cover is in the closed position, the rotatable centerpiece is substantially placed within the second slot;

when the cover is opened, the second rotating shaft is an axis on which the cover is pivoted;

when an original medium to be scanned is placed on the scanning body and positioned by the cover, the rotatable centerpiece is rotated to a second position.

14. The scanning device according to claim 9, wherein at least a groove is formed in a sidewall of the first slot, a flange is projected from the first end of the hinge and able to slide and rotate in the groove, when the cover is opening, the flange is rotating and sliding within the groove until the hinge is moved to a third position wherein the second end of the hinge is projected from the slot, when a thick original medium to be scanned is placed on the scanning body and positioned by the cover, the flanges is rotated inside the groove and the hinge is rotated to a fourth position.

* * * * *